(12) United States Patent
Karlsson

(10) Patent No.: US 8,155,042 B2
(45) Date of Patent: Apr. 10, 2012

(54) METHOD AND ARRANGEMENT RELATING COMMUNICATION DEVICES

(75) Inventor: Thomas Karlsson, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 726 days.

(21) Appl. No.: 12/257,863

(22) Filed: Oct. 24, 2008

(65) Prior Publication Data
US 2010/0103847 A1 Apr. 29, 2010

(51) Int. Cl.
G08C 17/00 (2006.01)
(52) U.S. Cl. ............ 370/311; 455/522; 455/69
(58) Field of Classification Search .......... None
See application file for complete search history.

(56) References Cited

U.S. PATENT DOCUMENTS

| | | | | |
|---|---|---|---|---|
| 6,671,340 | B1 * | 12/2003 | Kroeger et al. | 375/350 |
| 2001/0017598 | A1 * | 8/2001 | Townsend et al. | 342/357.1 |
| 2001/0023175 | A1 * | 9/2001 | Kroeger et al. | 455/61 |
| 2002/0031105 | A1 * | 3/2002 | Zeira et al. | 370/337 |
| 2004/0002352 | A1 | 1/2004 | Sendonaris | |
| 2004/0092233 | A1 | 5/2004 | Rudrapatna | |
| 2006/0046765 | A1 * | 3/2006 | Kogure | 455/522 |
| 2006/0253736 | A1 * | 11/2006 | Rudolf et al. | 714/12 |

FOREIGN PATENT DOCUMENTS

WO WO 03/079575 A1 9/2003

OTHER PUBLICATIONS

International Search Report and Written Opinion issued in the corresponding international application No. PCT/EP2009/055050, mailed Aug. 18, 2009, 11 pages.

* cited by examiner

Primary Examiner — Jianye Wu
(74) Attorney, Agent, or Firm — Harrity & Harrity, LLP

(57) ABSTRACT

A method for use in controlling transmit power of a radio transceiver for communication with a receiving and/or transmitting node is provided. The method may include transmitting a signal from the radio transmitter, the signal including a Transmit Power Control portion, and altering the TPC retransmission when the radio transmitter is in a fixed environmental condition.

14 Claims, 6 Drawing Sheets

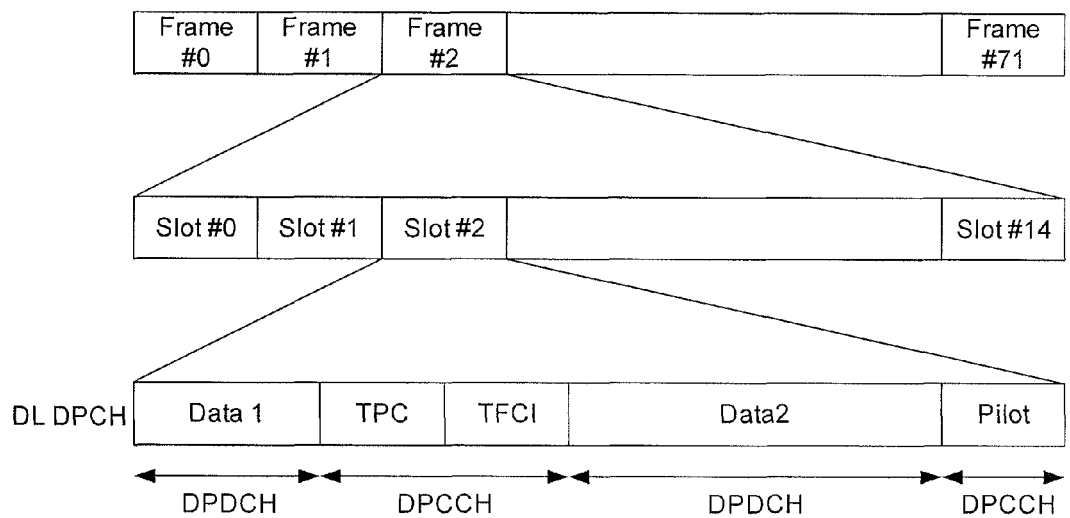
Fig. 4
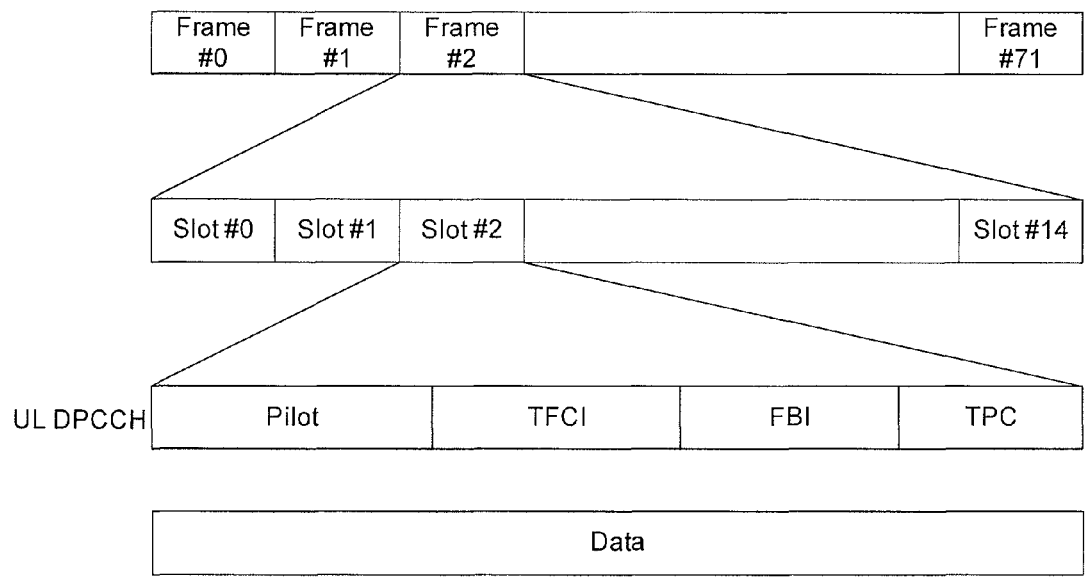

METHOD AND ARRANGEMENT RELATING COMMUNICATION DEVICES

TECHNICAL FIELD

The present invention generally relates to communications network and, more particularly, to power saving when transmitting.

BACKGROUND

Universal Mobile Telecommunications System (UMTS) is one of the third-generation (3G) cell phone technologies. Currently, the most common form of UMTS uses W-CDMA (Wideband Code Division Multiple Access) as the underlying air interface. It is standardized by the 3GPP (3rd Generation Partnership Project), and is the European answer to the ITU IMT-2000 requirements for 3G cellular radio systems.

To differentiate UMTS from competing network technologies, UMTS is sometimes marketed as 3GSM, emphasizing the combination of the 3G nature of the technology and the GSM standard which it was designed to succeed.

In UMTS, for example, rate matching is used to match the amount of data to be transmitted to the available capacity of the different physical channels. It can be done either through puncturing the bits (applicable for both uplink and downlink) if there is too much data for the capacity of the physical channel, or through repeating the bits (applicable for uplink) if there is a fewer number of bits when compared to the physical channel capacity.

DTX (discontinuous transmission) is employed in UTRA TDD systems, (1.28 Mcps and 3.84 Mcps), on a CCTrCH (Coded composite Transport Channel) basis when there is no data to transmit for this CCTrCH. A CCTrCH supports a portion or all of the transmissions of a user. A user may use one or more CCTrCH's within a given timeslot. When DTX is activated for a CCTrCH, there is no transmission on any physical channel supporting this CCTrCH, except for the first physical channel and only every Special Burst Generation Period (SBGP) frames (for uplink(UL)) or every Special Burst Scheduling Parameter (SBSP) frames (for Down Link (DL)), where SBGP or SBSP is configured at radio link setup. The use of DTX results in significant system and user performance benefits as less interference is generated in the system, and handset battery life may be conserved in the UL.

For the DL rate matching, if the number of bits to be transmitted is lower than the maximum allowed bits, then DTX indication bits are used to fill up the radio frame. DTX indication bits only indicate when the transmission should be turned off, they are not transmitted.

Unlike UL, where the data rate can be changed every TTI (Transmission Time Interval), the downlink data rate is fixed, unless changed via higher layer scheduling or through the use of compress mode patterns.

The current consumption during a call is a problem in UMTS. In release 6, for example, it is possible to have a functioning DTX in which a burst is only send a 10th of the slot time; during Transmit Power Control (TPC) information. It means that both DPDCH (Dedicated Physical Data CHannel) and DPCCH (Dedicated Physical Control CHannel) could be quiet and the transmission radio frequency (TX RF) could be shut off during that time. It's called Fractional DCH, which comprises only pilot symbols and TPC commands, with multiple users multiplexed on to the same channel code in such a way that each user uses the channel code for only a fraction of each timeslot.

However, the call will consume a substantial amount of power in UMTS and there is no GPRS similar state available.

UMTS power control comprises open loop power control, inner loop power control, and outer loop power control.

Open loop power control is the ability of the UE transmitter to sets its output power to a specific value. It is used for setting initial uplink and downlink transmission powers when a UE is accessing the network.

Inner loop power control in the uplink is the ability of the UE transmitter to adjust its output power in accordance with one or more TPC commands received in the downlink, in order to keep the received uplink Signal-to-Interference Ratio (SIR) at a given SIR target. The UE transmitter is capable of changing the output power with a step size of 1, 2, and 3 dB, in the slot immediately after the TPC_cmd can be derived. Inner loop power control frequency is 1500 Hz.

The serving cells estimate SIR of the received uplink DPCH, generate TPC commands (TPC_cmd) and transmit the commands once per slot according to the following rule: if SIRest>SIRtarget, then the TPC command to transmit is "0", while if SIRest<SIRtarget, then the TPC command to transmit is "1". Upon receipt of one or more TPC commands in a slot, the UE derives a single TPC command for each slot, combining multiple TPC commands if more than one is received in a slot.

Outer loop power control is used to maintain the quality of communication at the level of bearer service quality requirement, while using as low power as possible. The uplink outer loop power control is responsible for setting a target SIR in the Node B for each individual uplink inner loop power control. This target SIR is updated for each UE according to the estimated uplink quality (BLock Error Ration, Bit Error Ratio) for each Radio Resource Control connection. The downlink outer loop power control is the ability of the UE receiver to converge to required link quality (BLER) set by the network (RNC) in downlink.

Power control of the downlink common channels is determined by the network. In general the ratio of the transmit power between different downlink channels is not specified in 3GPP specifications and may change with time, even dynamically.

Additional special situations of power control are power control in compressed mode and Downlink power during handover.

SUMMARY

Embodiments of the present invention overcome the above-mentioned power consumption and power control problem.

Embodiments of the present invention may provide a method for use in controlling transmit power of a radio transceiver (MS) for communication with a receiving and/or transmitting node (BS). The method may include the steps of: transmitting a signal from the radio transmitter, the signal comprising a Transmit Power Control portion, and altering the TPC re-transmission when the radio transmitter is in a fixed environmental condition. For example, the fixed environmental condition may include no fading signal conditions. In one embodiment, the condition may be detected by detecting movement of the radio transceiver. According to one aspect of the method, if no TPC is sent back to the node, the node may be configured to hold a transmission power level constant. The method may include skipping pre-determined orders of TPC transmission. Based on a correct function during a time period, additional TPC orders are skipped. For example, if a signalling pattern is corrupted and/or interrupted, the node may be configured to assume that the MS is not accessible after a certain period. The MS may be configured to backtrack a TPC pattern, and if radio channel is constant during a period of time, the MS may start reducing the TPC. According to one aspect of the invention, the MS is classified, such that highest classes are provided with accelerometers, allowing the MS to sense if conditions are changed. An MS having higher class may allow more TPC reduction. For example, to bring the MS and BS into active mode, either the BS or the MS may send a certain pattern on top of a TPC signal at the same time as an expected TPC. A signal with a pre-decided spreading code may be added on top and the TPC transmitted with a higher power, which may stop TPC reduction mode.

Embodiments of the invention may provide a radio transceiver (MS) for communication with a receiving and/or transmitting node (BS). The radio transceiver may include: a transmitter portion for transmitting a signal, the signal comprising a Transmit Power Control (TPC) portion, at least one arrangement for detecting movement of the radio transceiver, and a controller configured to vary the TPC re-transmission based on output of the at least one arrangement for detecting movement. For example, the at least one arrangement for detecting movement of the transmitter is one or several of a motion sensor, an accelerometer, means for detecting TPC changes and/or means for measuring received signal characteristics.

Embodiments of the invention may provide a base station (BS) for communication with a user equipment (UE) in a communication network. The BS may include: a receiver portion for receiving a signal from the UE, the signal comprising a Transmit Power Control (TPC) portion, and a controller configured to vary the TPC re-transmission based on the signal from the UE with respect to movement of the UE.

BRIEF DESCRIPTION OF THE DRAWINGS

The present invention will now be described in more detail in relation to the enclosed drawings, in which:

FIG. 4 illustrates the DL and UL DPDCH time slots;

DETAILED DESCRIPTION

Figure 1:
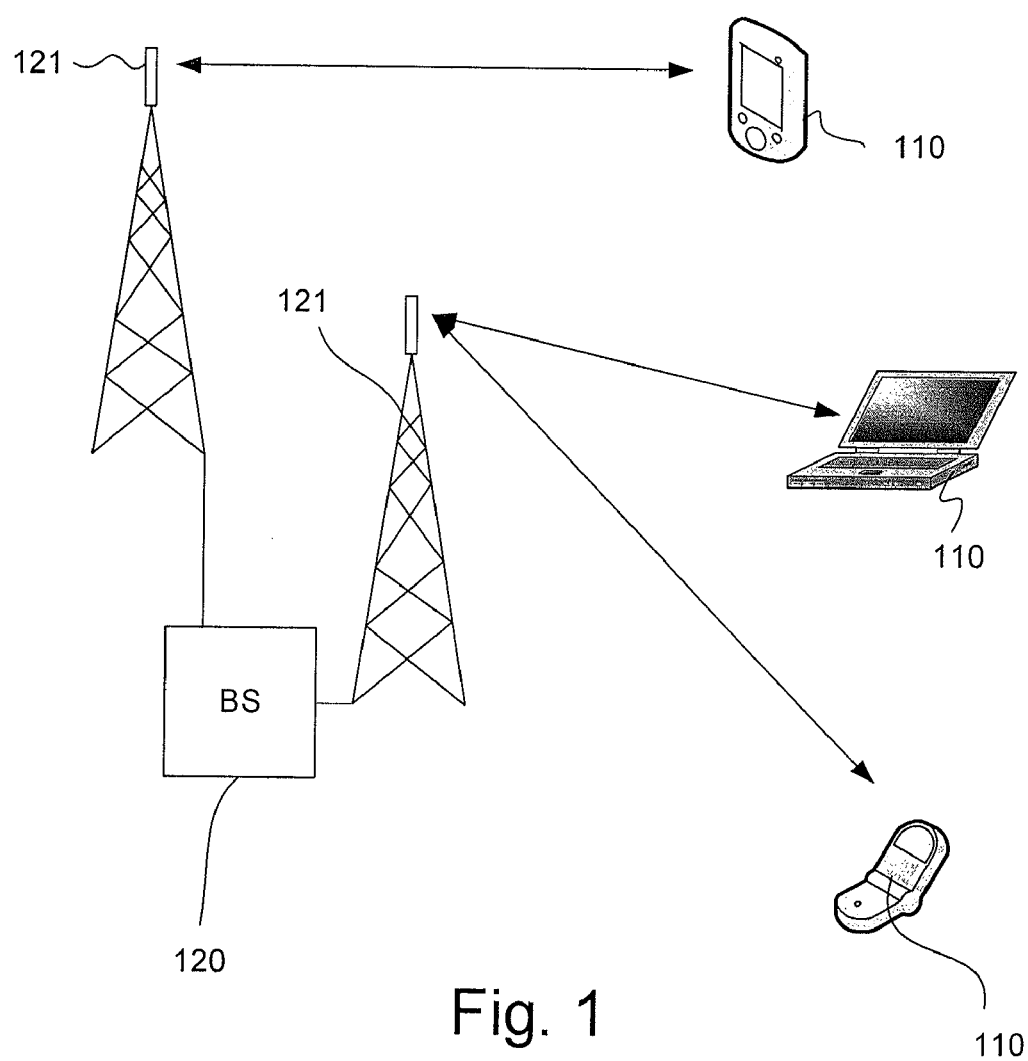
FIG. 1 shows a communications network comprising devices according to the present invention.

FIG. 1 illustrates a communications network 100, for example, a UMTS, that may include a number of mobile communication devices 110 and a base station (BS) 120 (Node B), with corresponding transceiver antennas 121. Here, the mobile communication device 110 may include a mobile phone, a PDA, and/or a laptop, however, other communication devices may implement the teachings of the present invention.

According an embodiment of the present invention, mobile device 110 may be configured, for example, for communication in a UMTS network, and to reduce the TPC send backs when it is in a fixed environmental condition, for example, no fading conditions.

If no TPC is sent back to the BS, the BS may be configured to interpret this as "hold power level constant."

Figure 2:
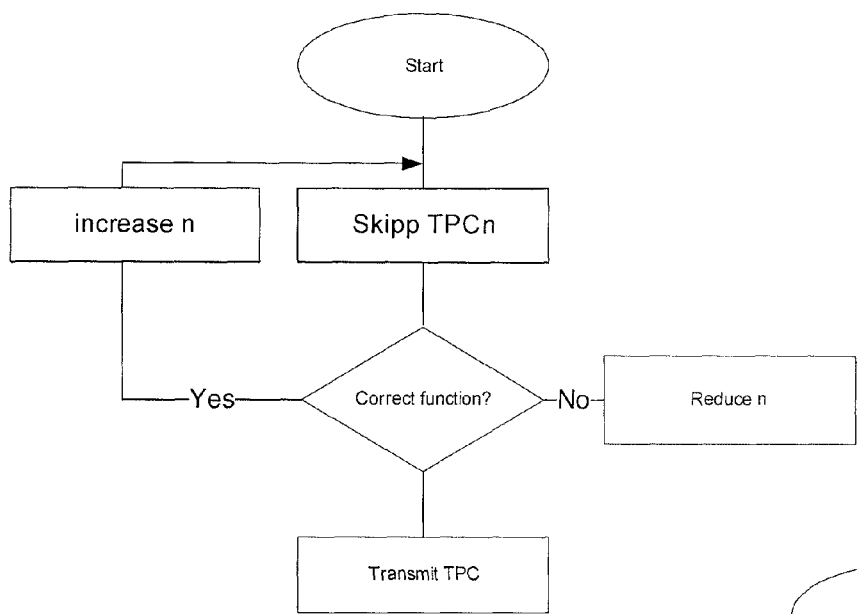
FIG. 2 is a flow diagram illustrating some steps of the present invention at MS.

Referring now to the flow diagram of FIG. 2, showing the course of events at the MS, the method may start with skipping, for example every second TPC, and if working out during a fixed time start skip 3 out of 4 TPC, and so on. In FIG. 2, this is indicated as TPCn, in which n is the number of skipped TPC.

If the signaling pattern is corrupt and/or interrupted, the BS may determine that the MS is not accessible, but it must involve a time-out.

Figure 3:
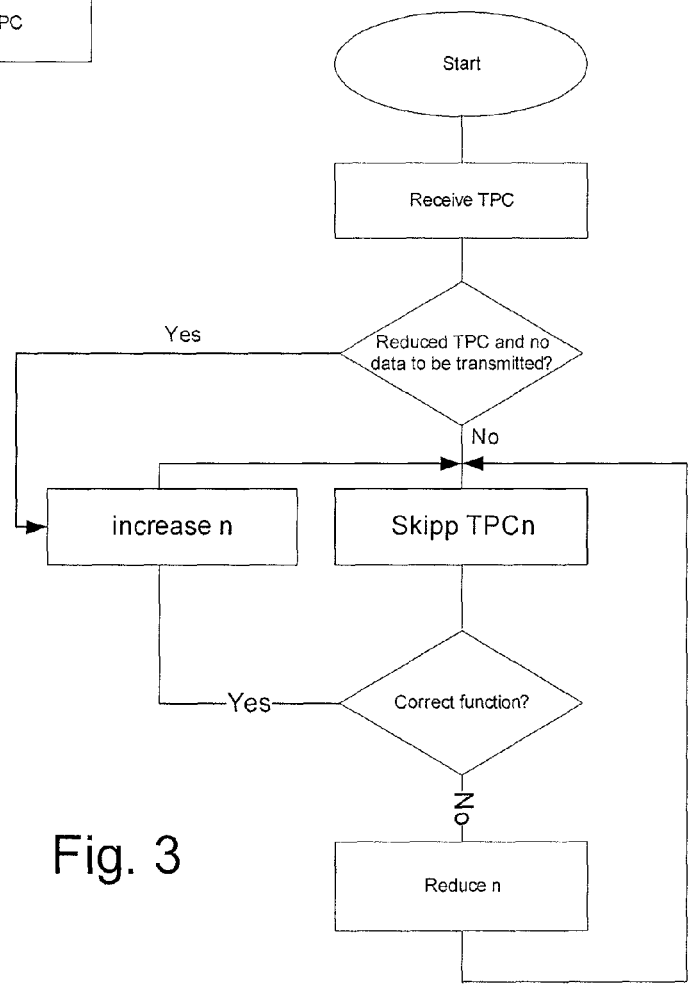
FIG. 3 is a flow diagram illustrating some steps of the present invention at BS.

FIG. 3 illustrates a flow diagram showing the course of events at the BS. When the reduced TPC occurs from the device, the BS should respond with same behavior, start reducing the DL TPC. It is true only if no data is needed to be sent. That allows the MS to be shut down allowing further current saving.

The device may be enabled to backtrack the TPC pattern. If the TPC is very stabile, even for a short period of time, for example, it may trigger the function of reducing the TPC. Backtracking may be done by using a memory which stores the latest TCR/SIR changes.

A stabile TPC may be indicative that the radio channel is constant and potentially that the device is stationary and also that major reflector close to the mobile device is substantially still. Here, a reflector means objects that create multi-path signals resulting in fading variations.

Figure 5:
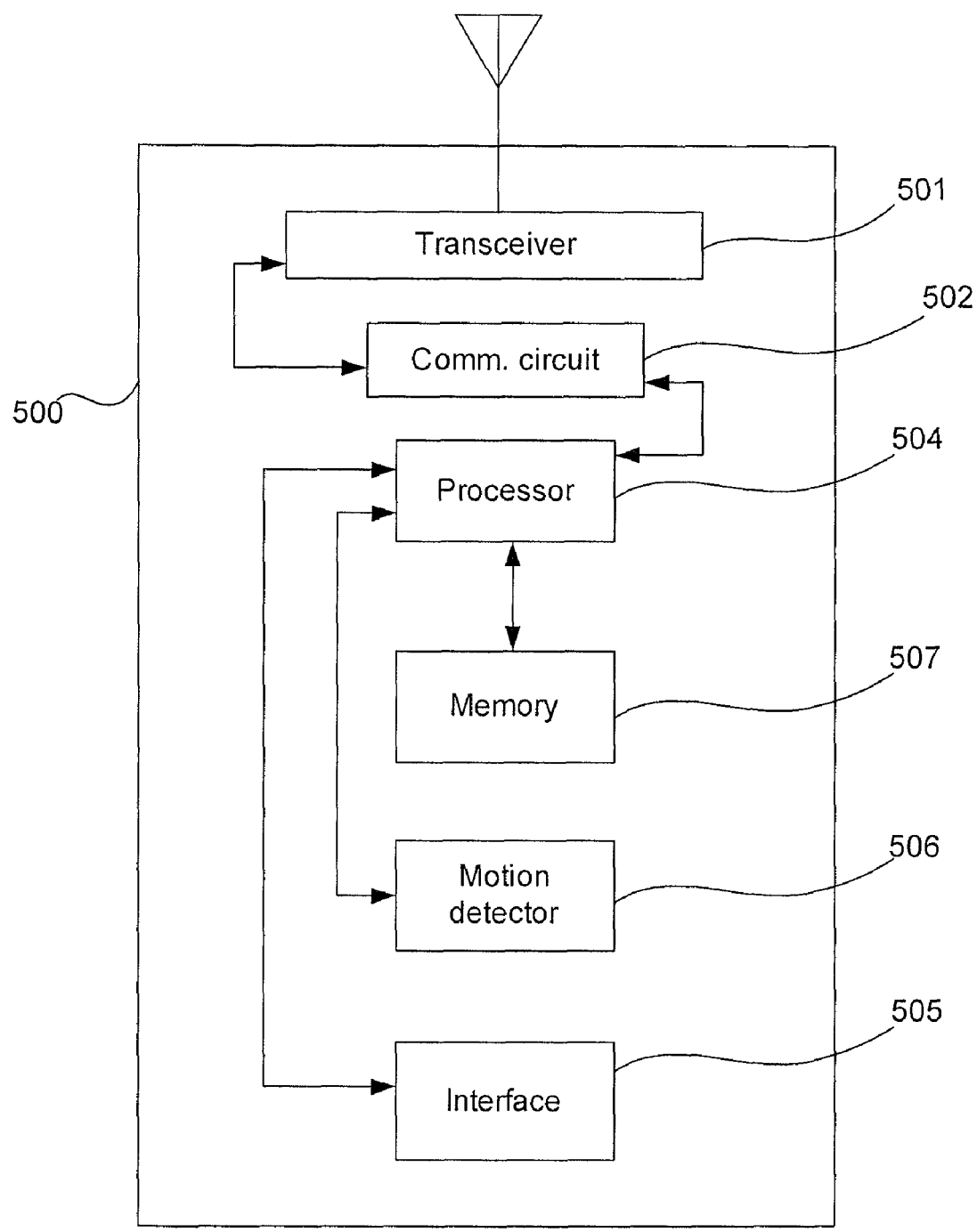
FIG. 5 shows schematically a transmitter device according to present invention.

FIG. 5 illustrates the DL and UL DPDCH time slots including TPC bits. UMTS may have several different time slot configuration based on the used channel. FIG. 4 is an example of DPCH (Dedicated Physical Channel) downlink and uplink time slot allocation. Feedback Information (FBI) may be used for closed-loop transmission diversity. Transport Format Combination Indicator (TFCI) may contain the information relating to data rates. Pilot bits may always be the same and may used for channel synchronization. According to an embodiment of the invention, TPC bits may be used to indicate absence of TPC, i.e., reduced TPC. In uplink, there may be modes 1 and 2. Mode 2 has the option step up power, step down power and/or do nothing. That means more than 1 bit information. The system may work better with Mode 2, but if non-fading conditions appear in Mode 1, the average TPC data would be 50% up 50% down=>TPC=0.5

According to another aspect of the invention, different types of MS classes may be introduced. As such, the highest classes may have motion detecting sensors allowing the MS to sense if conditions are changed, for example, from no movement to moving condition, and if already in movement there may be unconditional Raleigh fading. An MS having higher class may then allow more TPC reduction than an MSs without a motion detector.

FIG. 5 is a block diagram of one example of a (wireless) device 500 which may be, for example, a wireless handheld device, such as cell phone, including a wireless transmitter/receiver (transceiver) 501. Device 500, in this example, may include wireless telephone circuitry 502 coupled to the wireless transmitter as known in the art (e.g., transceiver), a processor 504 and operatively coupled to logic, such as processor 504 that performs operations such as controlling the device internal and external communication and in addition may provide additional functions as well known for a skilled person. The various functional elements shown are operatively coupled with processor 504 through conventional communication links and are shown by the bidirectional arrows. In this example, in addition, device 500 also may include a local user interface 505 such as a track wheel, touch sensitive pointing device, keypad, display etc., or any other suitable local graphic user interface control mechanisms. In this example, a keypad may also be operatively coupled to telephone circuitry 502 through processor 504, as known in the art, to allow the keypad to be used during wireless telephone operation. Device 500 may include a sensor for detecting the motion of the device, that is, a motion detector and/or accelerometer, or the like. A memory 507 may store instructions and data.

Processor 504 may execute instructions stored in memory 507 that, when executed, serve as logic operative to control the functions of device 500. Motion detector 506 may sense the physical movement of the device and provide, for example, selecting operations similar to those found on conventional mouse devices.

Thus, processor 504 may use the information received from motion detector 506 to transmit relevant TPC for controlling the transmission power.

In one embodiment, to bring the MS and the BS into active mode, either the BS or the MS may send certain (bit) patterns on top of the TPC signal at the same time as an expected TPC. The TPC signal may have a known spread factor of 256. A signal with a different spreading code already pre-decided may be added on top and the TPC signal may be transmitted with a higher power. This technique may tend to stop TPC reduction mode because conditions are changed and/or data is to be transmitted; DTX mode is ended.

For an MS with a motion detector, it may be possible to take itself out of TPC reduction mode by sensing its movement and start measuring power at the BS and require for TPC stop, for example, next scheduled time for sending a TPC.

A condition change may be generated either by the motion detector and/or tracking of TPC changes and/or measuring received signal characteristics, that is, for example, if signal strength varies due to movement of the transmitter. For all mentioned detection types, a threshold value may be determined, and if a threshold value is reached the device may stop the TPC reduction mode.

Consequently, the technique may allow a GPRS similar call in UMTS saving enormous amount of current compared with other techniques. Both MS and BS send only when so needed. The maximum TPC reduction rate may also be dependent on BS load.

Figure 6:
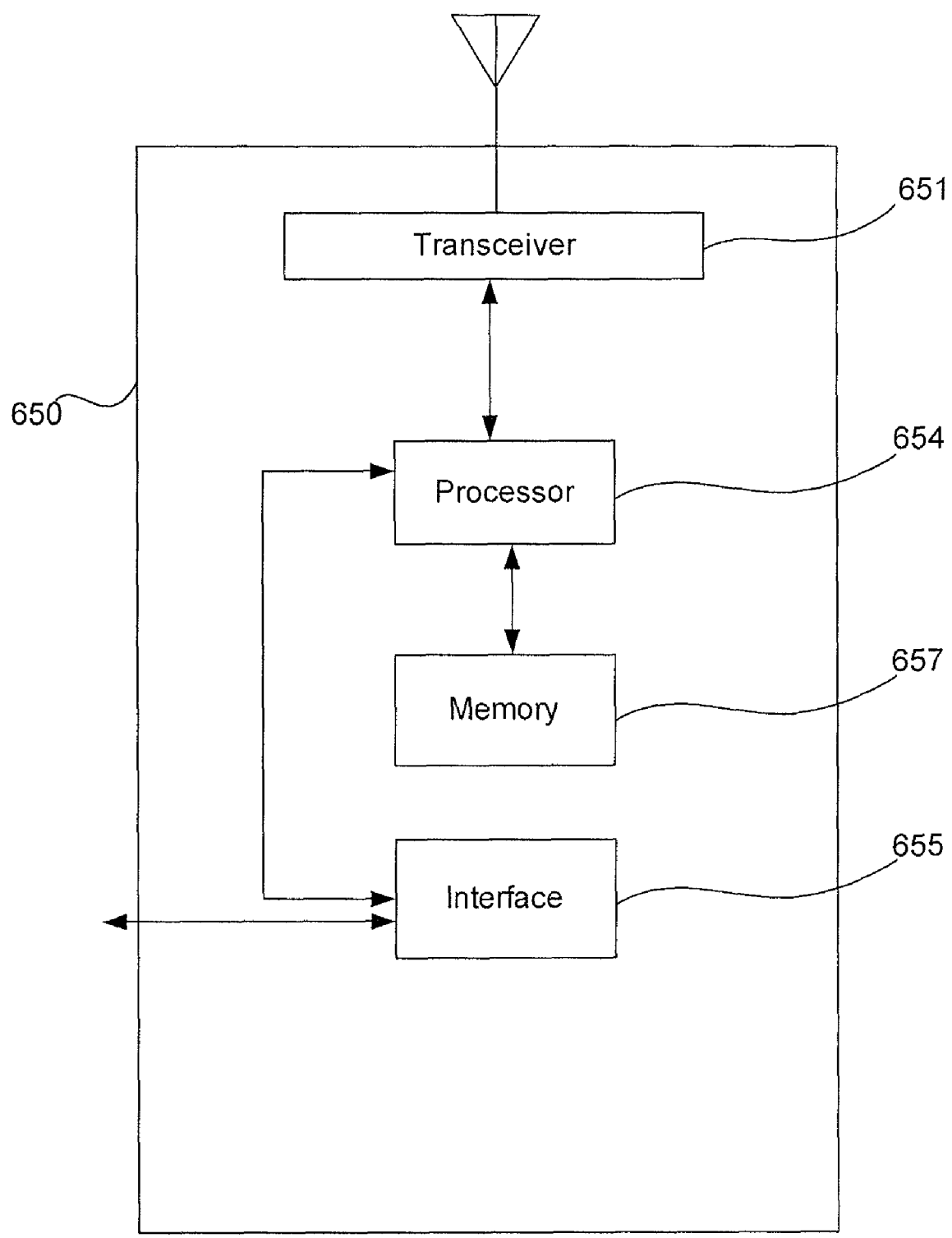
FIG. 6 shows schematically a base station according to present invention.

FIG. 6 is a block diagram of one example of a BS 650 including a wireless transmitter/receiver (transceiver) 651. BS 650, in this example, may include a processor 654 and be operatively coupled to logic, such as processor 654, that may perform various operations, such as controlling BS 650's internal and external communication and, in addition, may provide additional functions, as well known in the art. The various functional elements shown may be operatively coupled with processor 654 via conventional communication links, for example, shown by the bidirectional arrows. In this example, in addition, BS 650 may include an interface 655 for communication with other entities in the network. A memory 657 may store instructions and/or data. Processor 654 may execute instructions read from memory 657 that, when executed, may serve as logic operative to control the functions of the BS 650. The base station may include the transceiver portion for receiving a signal from the MS, which may include the Transmit Power Control (TPC) portion, and processor 654 may be configured to vary the TPC re-transmission based on the signal from the MS with respect to movement of the MS.

Figure 7:
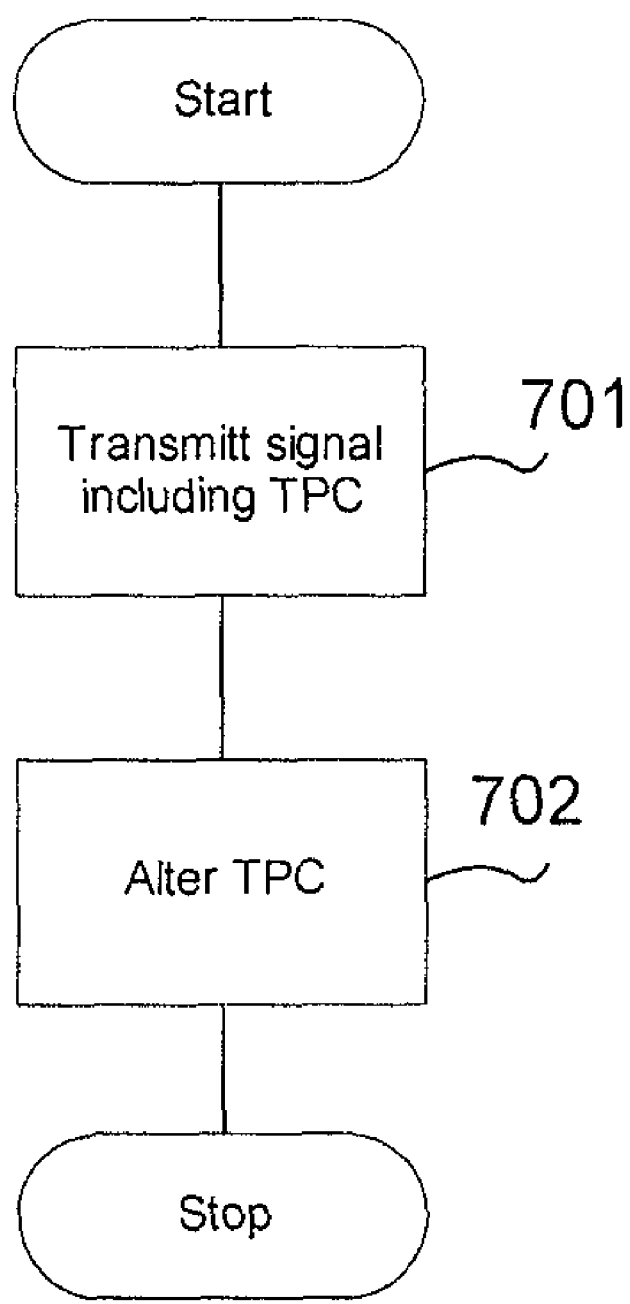
FIG. 7 is a flow diagram illustrating some steps of the present invention.

Flow diagram of FIG. 7 illustrates a basic method of the present invention including the steps of transmitting (701) a signal from the MS comprising a Transmit Power Control portion, and altering (702) the TPC re-transmission when the MS is in a fixed environmental condition.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented by means of both hardware and software, and that several "means" may be represented by the same item of hardware.

The above-mentioned and described embodiments are only given as examples and should not be limiting to the present invention. Other solutions, uses, objectives, and functions within the scope of the invention as claimed in the below described patent claims should be apparent for the person skilled in the art.

I claim:

1. A method for controlling transmit power of a mobile terminal when communicating with a communication node, the method comprising:
    transmitting a signal from the mobile terminal to set an output power of the mobile terminal to a first Transmission Power Control (TCP) level;
    determining that the mobile terminal is in a fixed environmental condition based on an amount of variation in a signal strength of signals associated with the mobile terminal; and
    extending an interval between a subsequent signal transmitted by the mobile terminal, where the subsequent signal sets the output power of the mobile terminal to a second, different TCP level based on the mobile terminal being in the fixed environmental condition.

2. The method of claim 1, where the mobile terminal is determined to be in the fixed environmental condition based on the amount of variation in the signal strength indicating an absence of fading signal conditions.

3. The method of claim 1, where determining whether the mobile terminal is in the fixed environmental condition includes:
    detecting an amount of movement of the mobile terminal; and
    determining that the mobile terminal is in the fixed environmental condition further based on the detected amount of movement.

4. The method of claim 1, further comprising:
    further extending the interval based on a correct functioning of the mobile terminal during a time period.

5. The method of claim 1, further comprising:
    determining, by the communication node, whether a signaling pattern associated with the mobile terminal is corrupted or interrupted based on the interval, where, after a certain period of time, the communication node determines that the mobile terminal is not accessible based on determining that the signaling pattern is corrupted or interrupted.

6. The method of claim 1, further comprising:
    backtracking a TPC pattern corresponding to TCP levels of the mobile terminal based on a signal-to-interference ratio received from the communications node;
    determining, based on backtracking the TPC pattern, whether TCP levels of the mobile device are constant over a particular period of time; and
    further extending the interval based on the TPC levels being constant during the particular period of time.

7. The method of claim 1, where to bring the mobile terminal and the communication node into an active mode, the communication node or the mobile terminal sends a certain pattern added to the subsequent signal.

8. The method of claim 7, where the certain pattern includes a pre-decided spreading code, and
where the subsequent signal is transmitted with a higher power, which stops an extension of the interval.

9. A mobile terminal for communication with a communication node, the mobile terminal comprising:
a transmitter portion to transmit a signal that sets an output power of the mobile terminal;
at least one arrangement to detect movement of the mobile terminal; and
a controller to:
adjust an interval between transmission of a subsequent signal for setting the output power of the mobile terminal based on an output of the at least one arrangement for detecting movement, and
transmit the subsequent signal at the adjusted interval.

10. The radio transceiver of claim 9, where the at least one arrangement for detecting movement of the transmitter is a motion sensor.

11. The radio transceiver of claim 9, where the at least one arrangement for detecting movement of the transceiver is an accelerometer.

12. The radio transceiver of claim 9, where the at least one arrangement for detecting movement of the transceiver comprises means for detecting TPC changes.

13. The radio transceiver of claim 9, where the at least one arrangement for detecting movement of said transceiver comprises means for measuring received signal characteristics.

14. A base station for communication with a user equipment (UE) in a communication network, the base station comprising:
a receiver portion to receive a plurality of signals from the UE, each signal, of the plurality of signals, identifying an output power of the mobile terminal; and
a controller to vary a transmission of another signal to the UE, where the transmission of the other signal is varied based on an interval associated with receiving each signal, of the plurality of signals, from the UE.

* * * * *